Nov. 3, 1964 J. J. FENNESSY 3,154,965
DRIVE MECHANISM FOR MICROFILM READER-PRINTER
Filed Aug. 15, 1962 4 Sheets-Sheet 1

INVENTOR.
JOHN J. FENNESSY
BY
ATTORNEY

Nov. 3, 1964  J. J. FENNESSY  3,154,965
DRIVE MECHANISM FOR MICROFILM READER-PRINTER
Filed Aug. 15, 1962  4 Sheets-Sheet 2
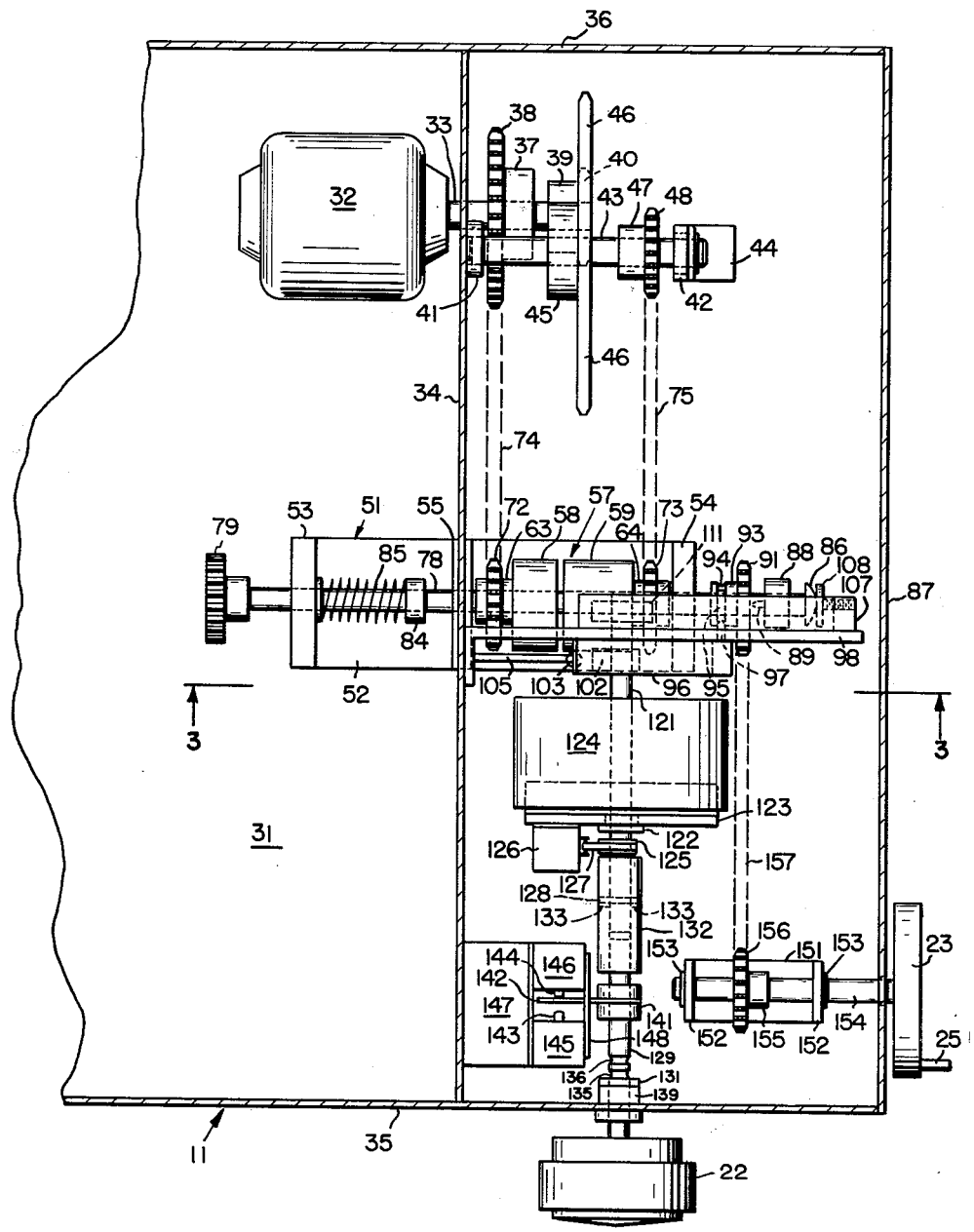
FIG. 2
INVENTOR.
JOHN J. FENNESSY
BY 
ATTORNEY Nov. 3, 1964     J. J. FENNESSY     3,154,965
DRIVE MECHANISM FOR MICROFILM READER-PRINTER
Filed Aug. 15, 1962     4 Sheets-Sheet 3
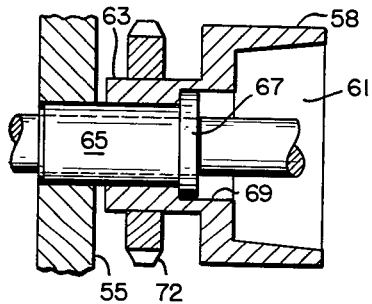
FIG. 5
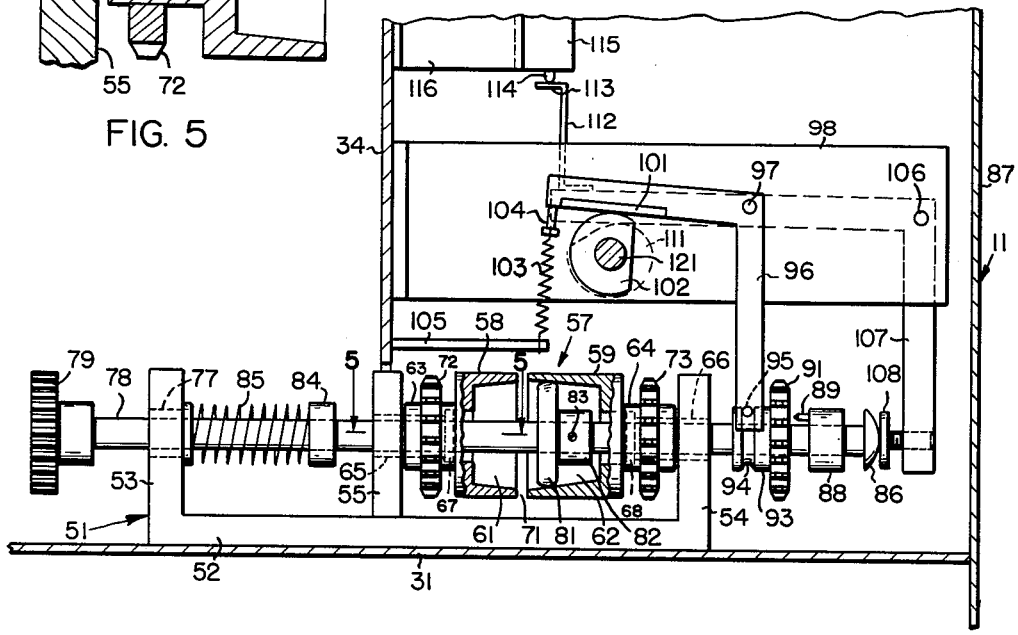
FIG. 3
FIG. 6
INVENTOR.
JOHN J. FENNESSY
BY
ATTORNEY Nov. 3, 1964   J. J. FENNESSY   3,154,965
DRIVE MECHANISM FOR MICROFILM READER-PRINTER
Filed Aug. 15, 1962   4 Sheets-Sheet 4

INVENTOR.
JOHN J. FENNESSY
BY
ATTORNEY

United States Patent Office 3,154,965
Patented Nov. 3, 1964

3,154,965
DRIVE MECHANISM FOR MICROFILM
READER-PRINTER
John J. Fennessy, 133 Thurston Road, Rochester 19, N.Y.
Filed Aug. 15, 1962, Ser. No. 217,222
12 Claims. (Cl. 74—472)

This invention relates to a drive mechanism, and more particularly to a drive mechanism for transporting films past the projecting lens in a combination microfilm viewing and printing machine or the like.

Microfilm viewers are provided with mechanism for reading, selecting, and printing individual frames of the microfilm record. One such machine is marketed as the "Filmac 100" reader-printer, and comprises a manually operated drive mechanism for transporting microfilm from a feeder reel, and across a projecting lens to a take-up reel. As the film passes the projecting lens the latter causes the film to be projected onto an illuminated screen. In the machine mentioned, the film is adapted to be transported in forward or reverse directions by manually rotating a handle or handwheel mounted on the exterior of the machine frame. If one wishes to make a print of a particular frame of the microfilm, the film is stopped when the image of that particular frame is projected onto the viewing screen; and the printing step is initiated by manipulating a few dials disposed on the front of the machine. A printed copy of the seletced microfilm frame is then automatically dispensed from the top of the machine.

One major disadvantage of prior machines is the need to rely upon a manually operable handle for operating the drive mechanism which transports the microfilm past the machine projector. For instance, after a roll of microfilm has been viewed, it is often necessary to rewind the film onto the original feeder spool. A substantial amount of time and effort is wasted when this operation has to be performed manually. Moreover, since one of the main purposes of such machines is the perusal of microfilm records of correspondence, checks, publications and the like, many of which items have been recorded in chronological if not numerical order, it is often desirable for an operator to skip over the unimportant or preliminary portions of the microfilm and to view only the significant frames thereof. In such instance the manual transportation of the microfilm past the projector again proves to be a slow and laborious task.

Another disadvantage of such prior machines is the inability to disconnect the manually operated drive mechanism from the microfilm spools. In the machine mentioned the film spools are mounted upon a turret which contains the projecting lens, and which is rotatable about a vertical axis. If the image which is projected onto the viewing screen is upside down, it may be righted by rotating the turret, and hence the film carried thereby, 180 degrees. With the manually operated drive mechanism heretofore employed, the rotation of the turret has tended also to advance or transport the films slightly so that the desired image is lost, therefore requiring further manipulation of the film drive to once again center the desired image on the viewing screen.

An object of this invention is to provide a suitable drive mechanism for automatically transporting film past the projector in a machine of the type described.

Another object of this invention is to provide an electrically operated, variable speed drive for transporting film past the projector in such a machine.

Another object of this invention is to provide an improved film drive mechanism for a microfilm reader-printer machine which will prevent undesirable transportation of the film past the projecting lens of the machine once the film has been stopped for a printing operation.

Another object of this invention is to provide an improved film drive mechanism for a film reader-printer machine which permits automatic, variable speed drive of the film in either a forward or a reverse direction.

An additional object of this invention is to provide a drive mechanism for microfilm in a reader-printer machine having an improved, slip-proof clutch which is compact, silent and relatively inexpensive to manufacture.

Other objects of the invention will be apparent hereinafter from the specification, and from the recital of the appended claims, particularly when read in conjunction with the accompanying drawings.

In the drawings:

FIG. 2 is an enlarged, fragmentary sectional view taken along the line 2—2 in FIG. 1 and looking in the direction of the arrows;

FIG. 3 is a fragentary sectional view on the same scale as FIG. 2, and taken along the line 3—3 in FIG. 2 and looking in the direction of the arrows;

FIG. 5 is a sectional view taken along the line 5—5 in FIG. 3, and shown on a scale larger than that of FIG. 3, and looking in the direction of the arrows; and FIG. 6 is an electrical diagram illustrating one way in which this machine may be wired to operate as described.

Figure 1:
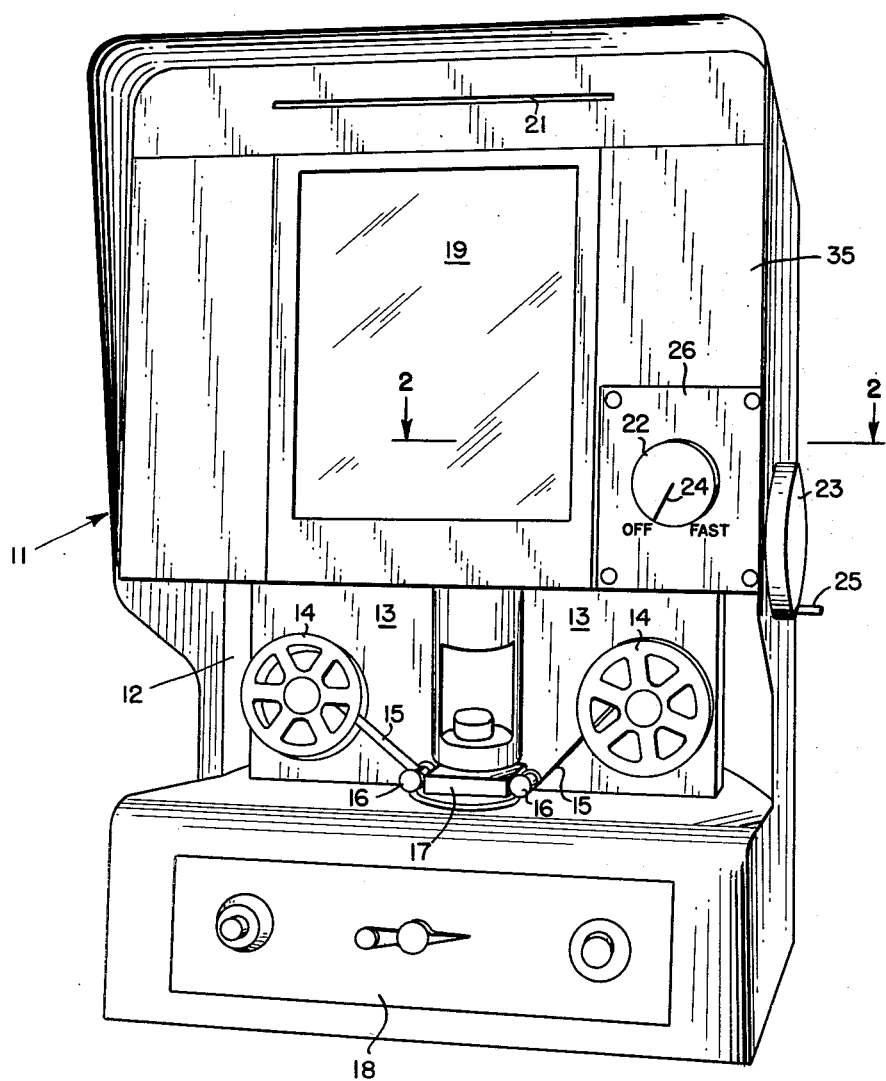
FIG. 1 is a front elevational view of a machine made in accordance with one embodiment of this invention.

In the novel drive mechanism illustrated, the feed shaft, which transports film past the projection lens of the reader-printer, may be driven automatically by a reversible electric motor of the permanent magnet type, or manually by a hand-operated crank. A manually operable control shaft is provided for selectively connecting the film feed shaft either to the electric motor or to the crank.

The motor, which is a reversible, variable-speed motor is connected by a high speed transmission to one of two clutch members, or drums, and by a low-speed transmission to the other of the two clutch members or drums. The drums are cup-shaped and have confronting conical recesses. They are mounted coaxially of the film feed shaft to rotate independently thereof and of one another. A generally disk-shaped clutch plate is secured to the film feed shaft, between the clutch drums, and is adapted to engage frictionally in the conical recess of one or the other drum when the film feed shaft is shifted into either of its extreme axial positions, thereby to couple the film feed shaft to one or the other of the drums. Thus, when the clutch disk is engaged with one drum the film feed shaft will be driven in a variable, high-speed range, and when it is engaged with the other drum the film feed shaft is driven in a variable, low-speed range. The film feed shaft may also be shifted to a third axial position intermediate its extreme positions, in which the friction disk is clear of both drums.

The speed of the motor is controlled by an adjustable auto-transformer, which is adjustable by rotation of the manually-operable control shaft, to vary the speed of the motor. It has three cams on it, one of which controls the auto-transformer, another of which controls the shifting movement of the film feed shaft and the third of which controls the connection of the hand crank to the film feed shaft.

The manually-operable control shaft is mounted for limited turning movement between an indicated "OFF"

position, and a "FAST" position 320 degrees from the "OFF" position. When the control shaft is moved to its "OFF" position, one cam thereon causes the autotransformer to be moved to its zero position to shut off the drive motor, a second cam thereon causes the film feed shaft to be shifted axially into an intermediate position in which the clutch disk is disengaged from both clutch drums; and the third cam thereon causes an axially slidable coupling member on the film feed shaft to engage a cooperating coupling member, which is rotatable on the film feed shaft and which is connected to the manually-operable crank to be operable thereby. The film feed shaft may then be rotated manually by the crank in a forward or reverse direction so that a frame of film can be readily centered in the viewing screen of the reader-printer machine, or transported in a forward or reverse direction as desired. Upon turning the control shaft from "OFF" position toward "FAST" position, however, the cams thereon adjust the speed of the drive motor through the adjustment of the auto-transformer, cause the film feed shaft to shift axially; and cause the crank to be disconnected from the film feed shaft. Initially the axial shaft of the film feed shaft engages the clutch disk with the low-speed clutch drum so that the film feed shaft is driven in its low speed range. As the control shaft is turned further away from "OFF" position, the speed of the drive motor is increased, and hence also the speed of rotation of the film feed shaft. After the control shaft has been rotated approximately 180°, the second cam on the control shaft causes the film feed shaft to shift axially until the clutch disk thereon engages the high speed clutch drum. The film drive shaft is then driven in its high speed range, and its speed will increase to a maximum as the control shaft is turned further from its 180° position to its 320° limit position.

In order to reverse the direction of rotation of the film feed shaft, the control shaft is made in two parts, which are coupled to one another to rotate together, and one part of which is mounted for limited, manual axial movement. The axially movable part of the control shaft may be manually shifted between two extreme positions in which a switch actuating arm carried thereby closes one of two switches that control the forward and reverse rotations, respectively, of the motor shaft. Also, the axially movable part of the control shaft may be manually shifted to position intermediate its extreme positions wherein the switch actuating arm carried thereby permits both of the last-named switches to remain open, therefore disconnecting the drive motor from the control circuit, regardless of the angular position of the control shaft relative to its "OFF" position. The film feed shaft may thus be stopped or reversed without returning the control shaft to its "OFF" position.

Referring now to the drawings by numerals of reference, and first to FIG. 1, 11 denotes the frame of one type of reader-printer machine in which my novel drive mechanism may be employed. This frame 11 has a recess 12 in it in which a turret 13 is mounted to rotate about a vertical axis. Mounted to rotate on the turret 13 are two film reels 14. The film 15 passes from one reel to the other beneath a pair of tension rolls 16, and an intermediate lens 17. Beneath lens 17 is a printer control housing having a control panel 18, and containing a light source (not illustrated) which causes images on the film 15 to be projected upwardly, and by a series of mirrors (not illustrated), onto a screen 19 mounted in the frame 11 above the turret 13. By proper manipulation of the dials on the control panel 18, any image appearing on screen 19 may be printed onto a paper (not illustrated) which is carried in the rear of the machine behind screen 19; and which, after an image has been printed thereon, is adapted to be dispensed from a slot 21 in the face of frame 11 above the screen 19. Projecting from the front face of, and from one side of frame 11, are two, manually operable, film-feed control knobs 22 and 23, respectively, which are provided with an index mark 24 and a hand crank 25, respectively. Mark 24 is adapted to read against the legends "OFF" and "FAST" on a plate 26 that is secured to the front face of the frame. The functions of knobs 22 and 23 will be described in more detail below.

Referring now to FIGS. 2 to 4, 31 denotes a stationary, horizontally disposed shelf or platform upon the upper face of which is mounted an electric motor 32 (FIG. 2) of the permanent magnet type. Motor 32 has an armature or output shaft 33 (FIGS. 2 and 4) which projects through an opening in a vertically disposed wall or partition 34 that extends between the front and rear walls 35 and 36, respectively, of frame 11. Secured by its hub 37 (FIG. 2) to shaft 33 is a drive sprocket 38. Also secured by its hub 39 to shaft 33 is a further drive sprocket 40 which has a substantially smaller diameter than the drive sprocket 38. Rotatably mounted in bearing 41 which is secured to wall 34 above the motor shaft 33, is an idler shaft 43. At its opposite end idler shaft 43 is rotatably mounted in a bearing 42 carried in the vertically disposed leg of a bracket 44 which is fastened to the face of platform 31. Secured by its hub 45 to shaft 43 so that it rotates in a plane substantially coplanar with sprocket 40 is a sprocket 46 which is larger in diameter than sprocket 38. Secured by its hub 47 to shaft 43 is a further sprocket 48 which is substantially the same in diameter as the sprocket 40. Sprocket 40 is connected by the chain 49 (FIG. 4) to sprocket 46 so that upon the rotation of motor shaft 33, shaft 43 is driven at a substantially lower speed or r.p.m. than is the motor shaft 33.

Secured to the upper face of platform 31 substantially midway between motor 32 and the front wall 35 of frame 11 is an elongate, stationary bracket 51 (FIGS. 2 to 4) having a rectangular base 52 which projects through the vertical wall 34, and which at opposite ends thereof has two vertically disposed legs 53 and 54, respectively. Intermediate its ends bracket 51 has a further vertically disposed leg 55 which projects upwardly from the bracket base 51 and into a recess in the bottom of wall 34.

Mounted between the bracket legs 54 and 55, and disposed upon the same side of the partition 34 as is the idler shaft 43, is a clutch designated generally at 57 in FIGS. 2 and 3. Clutch 57 comprises two cup-shaped drum members 58 and 59 which have conical recesses 61 and 62, respectively (FIGS. 3 and 5), and the members are mounted for rotation about a common, horizontally disposed axis with their recesses disposed in confronting relation. At their distal ends, drums 58 and 59 are provided with integral, reduced diameter cylindrical hub portions 63 and 64, respectively. The hubs 63 and 64 are mounted to rotate, respectively, about the outer peripheral surfaces of two, coaxial, annular bearings 65 and 66 (FIGS. 3 and 5) which have their outer ends secured in horizontal bores in the bracket legs 55 and 54, respectively; and which project slightly axially inwardly therefrom and into the axial bores in the drum hubs 63 and 64. At their inner ends bearings 65 and 66 are provided with integral ring flanges 67 and 68, respectively, which seat in corresponding annular recesses or counterbores 69 (FIG. 5) formed in the bores of the hubs 63 and 64, thereby to maintain a slight axial spacing 71 between the confronting faces of the clutch drums 58 and 59.

Secured on the hubs 63 and 64 for rotation therewith are sprockets 72 and 73, respectively (FIGS. 2 and 3). Sprocket 72 is connected by a chain 74 to the drive sprocket 38; and sprocket 73 is connected by a chain 75 to the drive sprocket 48. Therefore, upon operation of motor 32, the clutch member 58 will be rotated at a relatively high speed, while the clutch member 59 will rotate in the same direction, but at a substantially lower speed.

Rotatably mounted in the axial bores in the bearings 65 and 66, and extending coaxially and rotatably through the clutch members 58 and 59, and a further bearing 77 secured in bracket leg 53, is a film-feed shaft 78. Shaft 78 projects axially beyond opposite ends of bracket 51. Secured to the end of the shaft 78 which projects beyond the bracket leg 53 is a spur pinion 79 which drives a conventional film-feed mechanism (not illustrated) for rotating one of the film reels 14.

Shaft 78 is axially slidable in the bores of the bearings 65, 66 and 77. Axially slidable with the shaft 78 between the recesses 61 and 62 in the clutch members 58 and 59, respectively, is an annular friction disk or clutch plate 81 (FIG. 3). Clutch plate 81 has an integral hub portion 82, and is secured to the shaft 78 by a setscrew 83 or the like. Clutch plate 81 has secured to its peripheral surface a resilient ring of neoprene or the like whose outside diameter is slightly less than the maximum bore diameter of the clutch members 61 and 62. The clutch plate 81 may be shifted axially with shaft 78 between extreme positions in which it engages recess 61 or recess 62, respectively.

Secured to shaft 78 between the bracket legs 53 and 55 is an annular collar 84 (FIGS. 2 and 3). Surrounding shaft 78 between the collar 84 and the bracket leg 53 is a compression spring 85 which constantly urges shaft 78 to the right in FIG. 3.

At its end remote from pinion 79, shaft 78 projects beyond the bracket leg 54 and terminates in a rounded end or head 86. Secured to shaft 78 adjacent its rounded end 86 is an annular collar 88. Radially spaced from shaft 78, and projecting from the inner face of collar 88 parallel to shaft 78 is a relatively short dowel pin 89. Rotatably and slidably mounted on shaft 78 is a sprocket wheel 91. One face of wheel 91 confronts the collar 88 and has therein a plurality of circular recesses 92 (FIG. 4) which are arranged in a circular path about the axis of shaft 78. The dowel pin 89 is adapted to enter any one of these recesses upon shifting of wheel 91 axially toward the collar 88. Wheel 91 has a hub 93 which has a shallow, circumferential groove 94 formed in its outer peripheral surface.

Seated in the groove 94 in the sprocket hub 93 is a pin 95 (FIGS. 2 and 3). Pin 95 is carried by and projects from the lower end of a bell-crank lever 96 (FIG. 3) which is pivotally mounted intermediate its ends on a pin 97 which projects from a stationary bracket 98 that is secured to and projects laterally outwardly from the partition or wall 34 above the clutch 57 and the shaft 78. The upper arm of bell-crank lever 96 has a nylon insert 101 (FIG. 3) which is held constantly in engagement with the peripheral surface of a cam 102 (FIGS. 2 to 4) by a tension spring 103 which is connected at one end to a screw 104 on bell-crank 96 and at its other end to a stationary arm 105 mounted on and projecting outwardly from the partition 34.

Also pivotally mounted on bracket 98 by means of a pin 106 (FIG. 3) is a further bellcrank lever 107 which has adjustably threaded in one arm a screw having a head 108, which confronts the rounded end 86 on shaft 78. The other arm of the bellcrank 107 has a nylon insert (not illustrated) in it which rests constantly upon the peripheral surface of a cam 111. Secured to and projecting upwardly from the upper arm of the bellcrank 107 is a Z-shaped switch actuating bar 112 (FIGS. 3 and 4) having one arm 113 which engages the plunger 114 of a microswitch 115 carried by a bracket 116 projecting from wall 34 above the bracket 98.

The cams 102 and 111 are secured on a cam shaft 121 (FIGS. 2 to 4) which extends transverse to shaft 78, and which is rotatably mounted at one end in a bearing (not illustrated) carried by bracket 98, and at its opposite end in a bearing 122 (FIGS. 2 and 4) carried by a plate 123 which projects vertically upwardly from platform 31 between bracket 51 and the front wall 35 of the frame. At its inner end, shaft 121 projects through bracket 98 and has the cams 102 and 111 secured thereto on opposite sides, respectively, of this bracket. Between the bracket 123 and the cam 102, shaft 121 passes through a variable auto transformer 124 which is secured to the face of bracket 123. Rotatable with shaft 121 in the transformer housing is a conventional sliding contact (124' in FIG. 6) by means of which the voltage output of the transformer is varied.

Figure 4:
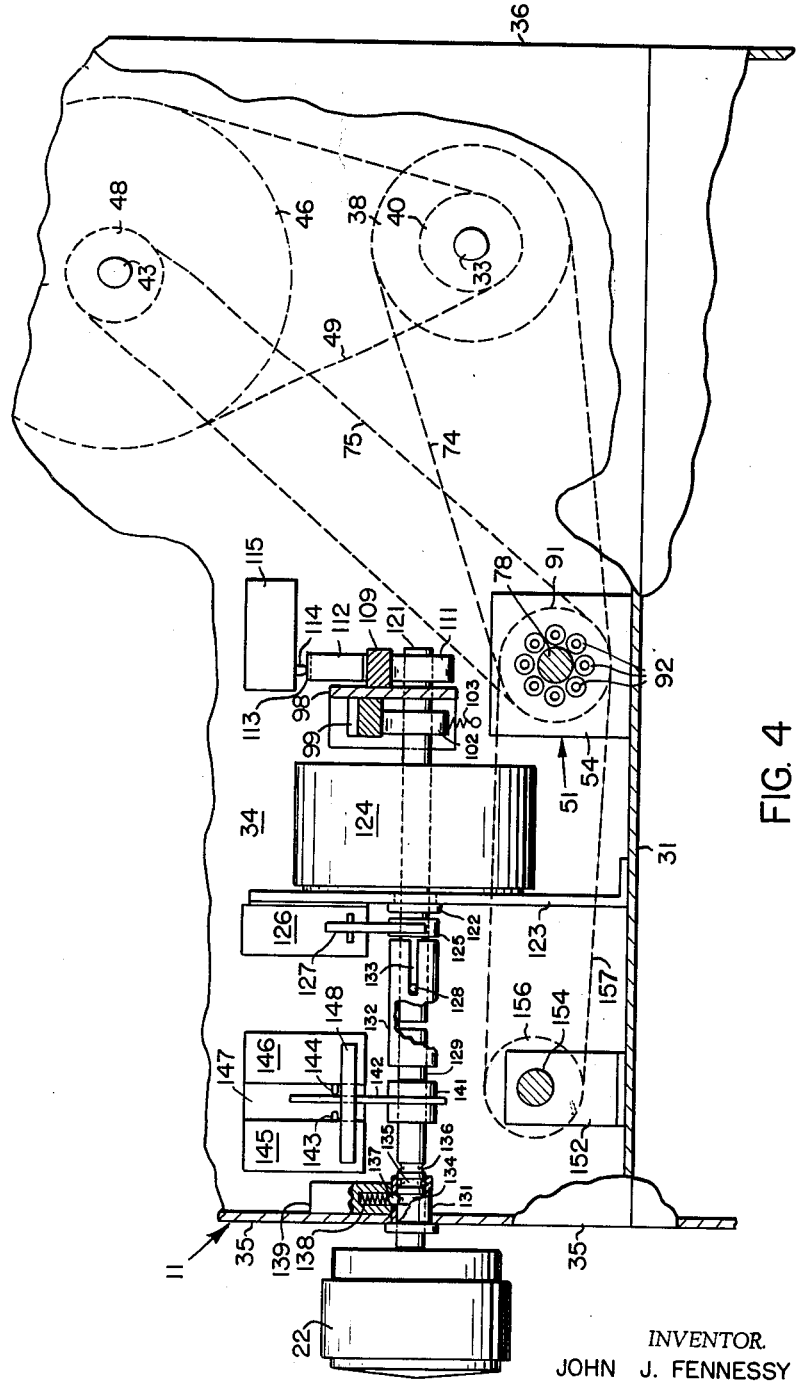
FIG. 4 is a fragmentary, side elevational view looking toward the right side of FIG. 2, and on the same scale as FIG. 2.

Shaft 121 projects axially forwardly beyond the bearing 122 and has secured thereon a further cam 125 (FIGS. 2 and 4). Mounted on bracket 123 above shaft 121 is a microswitch 126 which is actuated by an arm 127 that is pivotally mounted at one end on the switch, and which projects downwardly therefrom into engagement with the peripheral surface of cam 125.

The shaft 121 also extends for some distance forwardly of cam 125, and is coupled to an aligned shaft 129 by a pin 128 and a couping sleeve 132. Pin 128 extends diametrically through shaft 121 and engages at opposite ends in two diametrically-opposite, axially-extending slots 133 in sleeve 132. Sleeve 132 is secured to shaft 129; and shaft 129 is journalled at its forward end in wall 35 of the frame in a bearing 131.

Adjacent its forward end, shaft 129 is provided with three, axially spaced, circumferential grooves 134, 135 and 136, respectively (FIGS. 2 and 4). Adapted to seat in any one of the three grooves 134–136 in shaft 129 is a ball detent 137 (FIG. 4), which is constantly urged toward shaft 129 by means of a spring 138 carried in a housing 139 mounted above bearing 131 on the inner face of the frame wall 35.

Secured to shaft 129 adjacent sleeve 132 is a collar 141 (FIGS. 2 and 4). Rotatably mounted at one end in a circumferential groove in the peripheral surface of collar 141, and projecting radially outwardly therefrom is a switch actuating arm 142. Arm 142 at its free end extends between the confronting ends of the plungers 143 and 144 of two spaced microswitches 145 and 146 which are mounted on a block 147 secured to the partition 34. Upon axial shifting of shaft 129 the arm 142 is adapted to move therewith toward or away from a respective microswitch plunger 143 or 144. To hold arm 142 in alignment with plungers 143 and 144 during the rotation of shaft 129, the face of block 147 engages one side of arm 142 to prevent it from rotating in one direction; and a strap 148, which is secured to switches 145 and 146 and extends across the space therebetween, prevents the rotation of arm 142 in the opposite direction.

At its end remote from sleeve 132, shaft 129 projects through the front wall 35 of the frame and has secured thereon the previously described control knob 22 by means of which shaft 129 may be turned manually, or shifted manually axially in its bearing 131. Conventional means (not illustrated) is provided for limiting the turning of knob 22 (and hence shafts 129 and 121) to approximately 320 degrees between an extreme counterclockwise position (FIG. 1) in which indicator 24 registers with the "OFF" mark on plate 26, and an extreme clockwise position in which it registers with the "FAST" mark.

Secured to the face of platform 31 adjacent one side 87 and the front 35 of the frame is a generally U-shaped bracket 151 (FIG. 2). At opposite ends thereof the bracket 151 has legs 152 which project vertically upwardly. Journalled in bearings 153 in the bracket legs 152 to rotate about an axis which extends parallel to the film-feed shaft 78 is an auxiliary film-feed shaft 154. Secured by a hub portion 155 to shaft 154 intermediate bracket legs 152 is a sprocket wheel 156 which is connected by a chain 157 to the sprocket 91. Shaft 154 projects outwardly through the sidewall 87 of the frame and has the previously mentioned crank or control knob 23 secured thereto for manually rotating shaft 154.

Referring now to the electrical diagram in FIG. 6, the switches 115, 126, 145 and 146 are illustrated in the positions which they assume when the control knob 22 has been rotated manually to its extreme counterclockwise or "OFF" position as shown in FIG. 1; and shaft 129 has been axially shifted into its innermost position (FIG. 4) in which the spring loaded detent 137 is engaged in the groove 134. In this position, if power is placed across the input terminals $T_1$ and $T_2$ (FIG. 6) the current will be transmitted through lines 161, 162 and switch 126 to the terminals $T_3$ and $T_4$ of the printing circuit (not illustrated) which supplies power to the printing control panel 18 in FIG. 1. Also at this time the transformer 124 and motor 32 are deenergized, but cam 111 and bellcrank 107 (FIG. 3) have caused screw head 108 to shift shaft 78 slightly to the left in FIG. 3 so that the clutch plate 81 is disengaged from both clutch drums 58 and 59; and cam 102 has permitted spring 103 and bellcrank 96 to shift sprocket 91 to the right in FIG. 3 so that shaft 78 may be rotated by handwheel 23 through sprockets 156 (FIG. 2) and 91 (FIG. 3) and the chain 157 connecting them (FIG. 2).

To interrupt power to the printing circuit controlled by panel 18, and to energize motor 32 for driving the film feed shaft 78 control knob 22 must be turned clockwise from its "OFF" position; and the shaft 129 must be shifted into one of its extreme axial positions so that arm 142 on shaft 129 engages and closes one of the switches 145 or 146. For instance, assuming that shaft 129 is disposed in its axially innermost position as shown in FIG. 4, the arm 142 will cause switch 146 to be closed. Therefore, when control knob 22 is manually turned slightly clockwise from its "OFF" position (FIG. 1), cam 125 turns with shaft 121 and causes switch 126 to be switched to its uppermost position in FIG. 6 wherein it engages terminal $T_5$, thereby interrupting the power to the printing circuit through terminal $T_3$. Simultaneously, a circuit is completed to the variable auto transformer 124 from $T_1$ through line 162, switch 126, line 163, the transformer 124, and line 164 to terminal $T_2$. This supplies power to the permanent magnet motor 32 through the contact 124', a fuse 165, a low range rheostat 166, the closed switch 115, which is in parallel with and which shunts out a high range rheostat 167, a rectifier 168, line 172, now-closed switch 146, motor 32, and lines 173 and 164 back to terminal $T_2$. This causes the shaft 33 of motor 32 to rotate in one direction, for instance clockwise in FIG. 4.

Simultaneously with the interruption of the power to the printing circuit and the energization of transformer 124, the above referred to turning of knob 22 in a clockwise direction causes the cam 102 (FIG. 3), against the action of the tension spring 103, to shift the sprocket 91 to the left in FIG. 3 so that it becomes disengaged from pin 89, thereby disconnecting shaft 78 from the manually rotatable shaft 154 (FIG. 2). Concurrently with the shifting of sprocket 91 to the left in FIG. 3, the shaft 121, which turns with knob 22, causes cam 111 to rotate into a position in which compression spring 85 is free to urge shaft 78 and the clutch plate 81 thereon to the right in FIG. 3 until the plate seats in and frictionally engages the inner peripheral surface of the recess 62 in the low speed clutch drum 59 (FIG. 3). The above-mentioned clockwise rotation of the motor shaft 33 will thus be transmitted through sprocket 40, chain 49, sprockets 46 and 48, the chain 75, and the sprocket 73 to the clutch drum 59 which therefore is rotated at a low speed relative to the rotation of shaft 33. The rotation of the low-speed drum 59 is transmitted to the clutch plate 81, which is then in frictional engagement with the conical surface defining recess 62, thereby causing the shaft 78 and the pinion 79 thereon to rotate at a relatively low speed. The rotating pinion 79, through a conventional drive mechanism not illustrated, causes one of the film reels 14 to advance the film 15, for purposes of reference, in a forward direction past the lens 17 so that successive frames of the film are projected on the screen 19.

For approximately the first 150 degrees of turning movement of knob 22 in a clockwise position away from its "OFF" position, the clutch disk 81 remains engaged with the interior of the low-speed clutch drum 59. As the knob 22 is turned manually to 150° in a clockwise direction, transformer 124 is adjusted to increase the speed of motor shaft 33. The reels 14 are thus made to rotate in a variable, low-speed range.

Continued clockwise rotation of the knob 22 beyond 150 degrees from its "OFF" position causes cam 111 to pivot the bellcrank lever 107 clockwise about its pivot pin 106 so that set-screw 108 forces shaft 78 axially to the left in FIG. 3 against the action of the compression spring 85 until the clutch plate 81 is shifted from recess 62 into frictional engagement with the inner peripheral surface of the conical recess 61 in the high-speed clutch drum 58. The clockwise pivoting of lever 107 also causes the bracket leg 113 carried thereby to engage the switch plunger 114 and open the shunt switch 115 (FIGS. 3, 4 and 6) so that the rheostat 167 is placed in series with the rheostat 166 and the rectifier 168. This shifting of the clutch plate 81 into the high speed clutch drum 58, and the opening of switch 115 takes place within approximately 150 to 180 degrees of clockwise rotation of knob 22 from its "OFF" position. The introduction into the circuit of the rheostat 167 tends to slow the motor 32 slightly as its shift from its low speed to high speed range. In this high speed range, the rotation of the motor shaft 33 is transmitted through the drive sprocket 38 and chain 74 to the sprocket 72 on the high speed clutch drum 58, and thence to shaft 78 and its output pinion 79. Continued clockwise rotation of knob 22 beyond 180 degrees and up to its limit of approximately 320 degrees clockwise from its "OFF" position produces a corresponding increase in the output of transformer 124, and the speed of motor 32 within its high speed range. When knob 22 is in its high speed range, pinion 79 causes one of the reels 14 to drive the film 15 at a very high speed past the lens 17.

If at any time it is desired to halt the film 15 during its advance in a forward direction, one need only to use knob 22 to shift shaft 129 axially outwardly from its position shown in FIG. 4 until the detent 137 seats in the groove 135 in shaft 129, thereby causing the switch actuating arm 142 to be moved midway between the confronting ends of the switch plungers 143 and 144. At this time both of the switches 145 and 146 will be open thereby interrupting power to the motor 32 so that pinion 79 halts and ceases to drive the film spools 14. This axial shifting of shaft 129 and the switch actuating arm 142 into a neutral position may occur even though knob 22 and shaft 129 may at that time have been rotated clockwise from the "OFF" position into a position which lies in the low or the high speed range. Alternatively, the advance of film 15 may be interrupted by rotating knob 22 counterclockwise until it reaches its "OFF" position, in which case switch 126 will return to the position illustrated in FIG. 6 where it has interrupted a circuit to the motor 32, and has energized instead the terminals $T_3$ and $T_4$ to which the printing circuit is adapted to be connected.

To reverse the direction of the feed of film 15 one need only draw shaft 129 axially outwardly from frame 11 (to the left of FIG. 4) until the ball detent 137 seats in the groove 136, thereby causing the switch actuating arm 142 to engage the plunger 143 and close the switch 145. Switch 146 will of necessity at this time be open so that the polarity of motor 32 is reversed, thereby causing motor 2, pinion 79 and the film spools 14 driven thereby to be rotated in a reverse direction upon clockwise rotation of control knob 22 away from its "OFF" position. In a manner similar to that previously described, the speed at which the film 15 moves in a reverse direction will depend upon the extent to which knob 22 is rotated clockwise from its "OFF" position. Also as previously described, the movement of the film in the reverse direction may be halted either by shifting shaft 129 into its neutral position in which detent 137 engages in the shaft groove 135, or by rotating knob 22 counterclockwise to its "OFF" position.

A bleeder resistor 169 and a condenser 171 are placed in parallel with motor 32 across lines 172 and 173 to eliminate sparking between the contacts of switches 145 and 146 when the latter are opened and closed.

Whenever knob 22 and hence shaft 129 is rotated into its "OFF" position, the cam 102 permits spring 103 to pivot lever 96 counterclockwise about its pivot 97 and shift the sprocket 91 to the right in FIG. 3 so that the pin 89 may engage in one of the openings 92 (FIG. 4) in sprocket 91, thereby coupling the latter to shaft 78 for rotation therewith. At the same time, cam 111 causes shaft 78 to shift clutch plate 81 into a neutral position between drums 58 and 59. The film drive shaft 78 may then be manually rotated by turning the handwheel 23 so that the rotation thereof is imparted through shaft 154, sprocket 156 and chain 157 to the sprocket 91 on shaft 78. However, as soon as shaft 129 is rotated clockwise from its "OFF" position into any of the positions falling within the low or high speed range of motor operation, cam 102 causes sprocket 91 to be disengaged from pin 89 so that the rotation of the latter with shaft 78 cannot be transmitted by sprocket 91 back through chain 157 to the manually operated sprocket 156.

From the foregoing it will be apparent that applicant's novel film drive mechanism permits automatic and rapid viewing, or editing of film, in a manner which was heretofore impossible in prior reader-printers which employed only a hand crank device for advancing the film. Applicant's device incorporates a drive which permits the advance or return of film at variable speeds in either a low or a high range, respectively; and at the same time retains a manually operable crank which is automatically coupled to the film-feed shaft 78 only when the automatic drive therefor has been interrupted. By providing an automatic film drive which is operable in a variable, low speed range, applicant's device permits the reader-printer operator to use both hands for taking notes or for performing some other operation during the low speed transmission of film images across the viewing screen. Alternatively, the use of the automatic film drive in the high speed range eliminates the unnecessary time heretofore required to rewind film onto a spool after it has been fed therefrom through the viewer; and also prevents unnecessary delay in advancing the film to a predetermined spot along its length known by the operator to be of particular interest. Moreover, by employing an axially slidable control shaft 129 which incorporates a "neutral" position intermediate the forward and reverse drive positions thereof, it is possible for an operator to halt the film drive without having to rotate knob 22 completely back to its "OFF" position.

In addition, applicant's device employs a compact, silent, slip-proof clutch, which not only permits the operator to select a variable high or low speed range of film drive, thereby permitting him to compensate for speed changes of the film image due to film build-up on the take-up reel; but also permits the drive from a motor to the film-feed shaft to be interrupted by shifting the clutch into a neutral position when the control shaft 129 is turned to its "OFF" position. The neutral position of the clutch 57 eliminates any shifting of the image projected onto the screen 19 by permitting shaft 78 to rotate freely when the turret 13 is rotated 180 degrees to invert or rotate the film so that its image will be right side up on the viewing screen. Moreover, the resilient, neoprene surface formed on the outer periphery of clutch disk 81 is subjected to peripheral edge compression as the disk is thrust into a respective drum recess 61 or 62, thereby amplifying the frictional contact between drum and disk.

While the invention has been described in connection with a specific embodiment thereof, it will be understood that it is capable of further modification, and this application is intended to cover any variations, uses, or adaptations of the invention and including such departures from the present disclosure as come within known or customary practice in the art to which the invention pertains and as may be applied to the essential features hereinbefore set forth, and as fall within the scope of the invention or the limits of the appended claims.

Having thus described my invention, what I claim is:

1. In a film viewing and printing unit of the type in which film is rotated from one rotating reel to another past a projector lens, a mechanism for rotating said reels, comprising
   (a) a rotatable drive shaft connected to one of said reels to transmit its rotation thereto,
   (b) a variable speed, reversible electric motor for rotating said drive shaft,
   (c) means including a first clutch operable to connect and disconnect, respectively, said drive shaft and said motor,
   (d) a manually rotatable shaft, for rotating said drive shaft independently of said motor,
   (e) means including a second clutch operable to connect and disconnect, respectively, said drive shaft and said manually rotatable shaft,
   (f) a manually rotatable control shaft reciprocable manually in its axial direction,
   (g) clutch control means operative upon the rotation of said control shaft in one direction to cause said first and second clutches, respectively, to connect said drive shaft and said motor, and to disconnect said drive shaft and the first-named manually rotatable shaft, and vice versa upon the rotation of said control shaft in the opposite direction,
   (h) motor speed control means connected to said control shaft to increase and decrease, respectively, the speed of said motor upon the rotation of said control shaft in opposite directions, respectively, and
   (i) means responsive to the axial movement of said control shaft from one to the other of its extreme positions of reciprocation to reverse the direction of rotation of said motor, and operative upon the axial movement of said control shaft to a position intermediate its extreme positions, to interrupt the operation of said motor.

2. In a film viewing and printing unit of the type in which film is rotated from one rotating reel to another past a projector lens, a mechanism for rotating said reels, comprising
   (a) a rotatable drive shaft connected to one of said reels to transmit its rotation thereto,
   (b) a variable speed, reversible electric motor for rotating said drive shaft,
   (c) means including a first clutch operable to connect and disconnect, respectively, said drive shaft and said motor,
   (d) a manually rotatable shaft, for rotating said drive shaft independently of said motor,
   (e) means including a second clutch operable to connect and disconnect, respectively, said drive shaft and said manually rotatable shaft,
   (f) manually operable control means operative to engage and disengage said first and second clutches selectively, and operative to disengage said second clutch to disconnect said drive shaft from said manually rotatable shaft whenever said drive shaft and motor are connected to one another, and to disengage said first clutch to disconnect said drive shaft from said motor whenever said drive shaft and said manually rotatable shaft are connected to one another, said control means including
   (g) a second manually rotatable shaft which is reciprocable axially,
   (h) a controller for adjustably varying the speed of said motor,
   (i) means carried by said second manually rotatable shaft connected to the first and second clutches to operates the same upon rotation of said second manually rotatable shaft, (j) means actuatable upon rotation of said second manually rotatable shaft for adjusting said controller, (k) a pair of switches for controlling, respectively, the two directions of operation of said motor, and (l) means carried by said second manually rotatable shaft and operative upon reciprocation thereof to trip said switches selectively.

3. In a film viewing and printing unit of the type in which film is rotated from one rotating reel to another past a projector lens, a mechanism for rotating said reels, comprising (a) a rotatable drive shaft connected to one of said reels to transmit its rotation thereto, (b) an electric motor for rotating said drive shaft, (c) means including a first clutch operable to connect and disconnect, respectively, said drive shaft and said motor, (d) a manually rotatable shaft, for rotating said drive shaft independently of said motor, (e) means including a second clutch operable to connect and disconnect, respectively, said drive shaft and said manually rotatable shaft, (f) manually operable control means operative to engage and disengage said first and second clutches selectively, and operative to disengage said second clutch to disconnect said drive shaft from said manually rotatable shaft whenever said drive shaft and motor are connected to one another, and to disengage said first clutch to disconnect said drive shaft from said motor whenever said drive shaft and said manually rotatable shaft are connected to one another, (g) an electrical circuit connected to and controlling the operation of said motor, (h) said manually operable control means comprising a manually rotatable cam shaft, (i) a cam rotatable with said cam shaft, and (j) a switch engageable by said cam and connected in said circuit, (k) said cam being operative to cause said switch to interrupt the circuit to said motor when said drive shaft is connected to said manually rotatable shaft.

4. In a combination as claimed in claim 3 wherein (a) said cam shaft is rotatable between predetermined limits, (b) and a second cam and a third are secured to said cam shaft for rotation therewith, and (c) means connects said second cam to said first clutch, and said third cam to said second clutch, and (d) the second cam and the first-named cam are operative, respectively, upon the rotation of said cam shaft to one of its limits, simultaneously, to cause said first clutch to disconnect said motor from said drive shaft, and to cause said switch to interrupt said circuit to said motor, and (e) said third cam is operative, upon the rotation of said cam shaft away from said one of its limits, to cause said second clutch to disconnect said drive shaft from said manually rotatable shaft.

5. In a combination as claimed in claim 3, (a) an axially reciprocable switch actuating shaft, (b) means coupling said switch actuating shaft to said cam shaft to transmit the rotation of the former to the latter, (c) two further, normally open switches mounted in spaced relation adjacent said switch actuating shaft and connected in said circuit to control the direction of rotation of said motor, (d) an actuating arm mounted on said switch actuating shaft and reciprocable therewith between said two axially spaced switches to a first position in which one of said switches is engaged and closed by said arm to a second position in which neither of said two switches is engaged and closed by said arm, and to a third position in which the other of said two switches is engaged and closed by said arm, (e) said two switches being operative to completely interrupt the circuit to said motor when said arm is in said second position.

6. In a film viewing and printing unit of the type having apparatus for transporting film from one rotating reel to another past a projector lens, mechanism for rotating said reels, comprising (a) a rotatable drive shaft connected to one of said reels to transmit its rotation thereto, (b) two clutch members mounted to rotate coaxially about said shaft at axially spaced points therealong, (c) separate drive means connected, respectively, to the two clutch members and operative to rotate said clutch members at relatively high speed and at relatively low speed, respectively, (d) means mounted on said shaft to rotate therewith and selectively movable in to engagement with either of said two clutch members to connect said clutch members selectively to said drive shaft, (e) control means for effecting movement of said connecting means, (f) a second shaft rotatably mounted adjacent said drive shaft and adapted to be rotated manually, and (g) means for selectively connecting and disconnecting said drive shaft and said second shaft, (h) said control means being operative, upon engagement of said connecting means with either of said clutch members, to cause the last-named means to disconnect said drive shaft and said second shaft from one another, (i) said last-named means including a first, rotatable, coupling element mounted on said drive shaft for limited movement axially therealong, and connected to said second shaft for rotation therewith, and (j) a second coupling element secured to said drive shaft and engageable with said first element to connect said drive shaft and said second shaft to one another, (k) said control means comprising a manually operable cam shaft mounted adjacent said drive shaft for limited rotation, and (l) at least two cams secured on said cam shaft for rotation therewith, and (m) means connecting one of said cams to said drive shaft and the other of said cams to said first coupling element, (n) said one cam being operative upon rotation thereof to shift said drive shaft and the clutch connecting means carried thereby into and out of operative position, and (o) said other cam being operative to move said first coupling element axially away from said second coupling element to disengage said elements when said clutch connecting means is in operative position.

7. In a combination as claimed in claim 6 wherein (a) said drive means includes an electric motor, and (b) at least one switch is mounted adjacent said cam shaft and connected in circuit with said motor, and (c) said clutch connecting means is disposed in said inoperative position and said one switch is open relative to said circuit when said cam shaft is rotated into one of its extreme positions, (d) and a further cam is secured to said cam shaft and is operative upon rotation of the latter away from said one extreme position to close said one switch.

8. In a combination as claimed in claim 7 wherein (a) two further, normally open, spaced switches are mounted adjacent said cam shaft and connected in said motor circuit, and (b) an actuating arm is mounted on said cam shaft for movement therewith into a first position in which it engages and closes one of said two switches to cause the shaft of said motor to rotate in one direction when the first-named switch is closed, and into a second position in which it engages and closes the other of said two switches to cause said motor shaft to rotate in the opposite direction when said first-named switch is closed, and into a third position between said two switches whereby the latter remain open and interrupt the motor circuit.

9. In a film viewing and printing machine,
   (a) a rotatable drive shaft,
   (b) a variable speed, reversible motor,
   (c) a pair of clutch members rotatably mounted on said drive shaft,
   (d) a cooperating clutch member secured to said drive shaft and movable axially of said drive shaft to connect said clutch members selectively to said drive shaft,
   (e) means for driving one of said clutch members from said motor at low speed,
   (f) means for driving the other of said clutch members simultaneously from said motor at relatively high speed,
   (g) a manually rotatable shaft,
   (h) a coupling member rotatably mounted on said drive shaft,
   (i) means for driving said coupling member from said manually rotatable shaft upon rotation of said manually rotatable shaft,
   (j) a cooperating coupling member secured to said drive shaft,
   (k) a manually rotatable and axially reciprocable control shaft,
   (l) means carried by said control shaft operable upon rotation thereof to vary the speed of said motor,
   (m) separate means carried by said control shaft operative after rotation of said control shaft in one direction through a predetermined angle to disengage said cooperating clutch member from said one clutch member and to engage said cooperating clutch member with said other clutch member,
   (n) means carried by said control shaft operative to engage and disengage said coupling members and operative to disengage said coupling members when said cooperating clutch member is engaged with either said one or said other clutch member,
   (o) a pair of switches for controlling the direction of rotation of said motor, one of said switches being operative, when closed, for closing a forward operating circuit to said motor, and the other of said switches being operative, when closed, to close a reverse operating circuit to said motor, and
   (p) means carried by said control shaft operative upon axial movement thereof in one direction to close one of said switches and operative upon axial movement of said control shaft in the opposite direction to close the other of said switches.

10. A drive mechanism comprising
    (a) a rotary shaft mounted for reciprocation axially of its centerline,
    (b) a pair of cup shaped clutch drums each of which has a cupped recess of conical configuration,
    (c) means mounting said drums on said shaft for rotation coaxially of said centerline, and with the recesses of said drums disposed in confronting, axially spaced relation,
    (d) drive means for rotating said drums at respectively different speeds,
    (e) a circular clutch plate secured to said drive shaft and having an outer peripheral surface adapted frictionally to engage the inner, conical walls of one or the other of said drums when said shaft has been shifted axially into one or the other, respectively, of its extreme positions, thereby to transmit the rotation of the engaged drum to said shaft, and
    (f) means for selectively reciprocating said shaft, including
    (g) a cam shaft mounted to rotate about an axis extending transverse to said drive shaft,
    (h) a cam secured to said cam shaft,
    (i) a pivotal lever having one end engaged with the camming surface on said cam, and having its opposite end engageable with said drive shaft to shift it axially into at least one of the extreme position of its reciprocation upon rotation of said cam, and
    (j) spring means engaging said drive shaft and constantly urging it axially toward the other of its extreme positions,
    (k) said drive means including an electric motor,
    (l) a second cam mounted on said cam shaft,
    (m) a switch mounted adjacent said second cam and wired in circuit with said motor and engageable by said second cam upon rotation of said cam shaft to a predetermined position, thereby to interrupt the circuit to said motor,
    (n) a further, manually operative drive shaft mounted to rotate parallel to the first-named drive shaft,
    (o) coupling means mounted on said first-named drive shaft and operable to connect it to said further drive shaft, and
    (p) a third cam mounted on said cam shaft and operative upon rotation of the latter into said predetermined position to operate said coupling means thereby to connect together said first-named drive shaft and said further drive shaft.

11. A drive mechanism comprising
    (a) a rotary shaft mounted for reciprocation axially of its centerline,
    (b) a pair of cup shaped clutch drums each of which has a cupped recess of conical configuration,
    (c) means mounting said drums on said shaft for rotation coaxially of said centerline, and with the recesses of said drums disposed in confronting, axially spaced relation,
    (d) drive means for rotating said drums at respectively different speeds,
    (e) a circular clutch plate secured to said drive shaft and having an outer peripheral surface adapted frictionally to engage the inner, conical walls of one or the other of said drums when said shaft has been shifted axially into one or the other, respectively, of its extreme positions, thereby to transmit the rotation of the engaged drum to said shaft, and
    (f) means for selectively reciprocating said shaft, including
    (g) a cam shaft mounted to rotate about an axis extending transverse to said drive shaft,
    (h) a cam secured to said cam shaft,
    (i) a pivotal lever having one end engaged with the camming surface on said cam, and having its opposite end engageable with said drive shaft to shift it axially into at least one of the extreme positions of its reciprocation upon rotation of said cam, and
    (j) spring means engaging said drive shaft and constantly urging it axially toward the other of its extreme positions,
    (k) said drive means including an electric motor of the permanent magnet type and a control circuit therefor,
    (l) two axially spaced and normally open switches mounted adjacent said cam shaft and connected in said control circuit, and
    (m) an actuating arm mounted on said cam shaft for limited movement parallel to the centerline of said cam shaft into a first position in which it engages and closes one of said two switches to cause said motor when energized to rotate in one direction, into a second position in which it engages the other of said two switches to cause said motor when energized to rotate in the opposite direction, and into a third position intermediate said first and second positions in which said two switches are open.

12. In a film viewing and printing machine,
(a) a rotary drive shaft,
(b) a reversible, variable speed motor,
(c) means for driving said shaft from said motor at relatively low speed,
(d) means for driving said shaft from said motor at relatively high speed,
(e) separate manually operable means for rotating said shaft,
(f) coupling means for coupling said manually operable means to said drive shaft to rotate said drive shaft manually,
(g) a manually rotatable and reciprocable shaft,
(h) means carried by the last-named shaft for adjusting, upon rotation of said last-named shaft, the speed of said motor and increasing the speed of the motor the further said last-named shaft is moved angularly away from its zero position,
(i) means carried by said last-named shaft operative while said last-named shaft is at any position between its zero position of rotation and a position spaced at a predetermined angle therefrom to couple to said drive shaft the first-named driving means while preventing coupling of the second-named driving means thereto,
(j) means carried by said last-named shaft operative when said last-named shaft has been rotated from zero position beyond said predetermined angular position to couple the second-named driving means to said drive shaft while uncoupling the first-named driving means therefrom,
(k) means carried by said last-named shaft for operating the first-named coupling means,
(l) said last-named means being operative to prevent actuation of said first-named coupling means when either of said drive means is coupled to said drive shaft, and
(m) means responsive to the movement of said last-named shaft from one to the other of its extreme positions of reciprocation to reverse the direction of rotation of said motor, and operative upon the movement of said shaft to a position intermediate its extreme positions, to interrupt the operation of said motor.

References Cited by the Examiner
UNITED STATES PATENTS

| | | | |
|---|---|---|---|
| 2,121,075 | 6/38 | Eason | 192—48 |
| 2,260,770 | 10/41 | Brownlee | 192—66 XR |
| 2,311,010 | 2/43 | Vickers | 318—2 |
| 2,316,874 | 4/43 | Kraft | 192—66 |
| 2,753,736 | 7/56 | Mitchell | 74—625 |
| 2,760,385 | 8/56 | Fuchs | 74—625 |
| 2,790,337 | 4/57 | Zelewsky et al. | 74—472 XR |
| 2,883,024 | 4/59 | Emrick | 192—48 |
| 2,884,105 | 4/59 | Tomlinson | 192—66 |

DON A. WAITE, *Primary Examiner.*